(12) United States Patent
Goodman et al.

(10) Patent No.: US 8,803,940 B2
(45) Date of Patent: Aug. 12, 2014

(54) MERGING CONTENT

(75) Inventors: Lee N. Goodman, Tyngsboro, MA (US); Rezwanul Azim, Lexington, MA (US); Robert H. Liao, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 308 days.

(21) Appl. No.: 12/845,181

(22) Filed: Jul. 28, 2010

(65) Prior Publication Data

US 2012/0026278 A1 Feb. 2, 2012

(51) Int. Cl.
*H04N 7/14* (2006.01)

(52) U.S. Cl.
USPC .......................................... 348/14.08

(58) Field of Classification Search
USPC ................. 348/14.01–14.16, 14.08
See application file for complete search history.

(56) References Cited

U.S. PATENT DOCUMENTS

| 7,716,283 | B2* | 5/2010 | Thukral | 709/204 |
| 8,108,899 | B2* | 1/2012 | Shoff et al. | 725/52 |
| 2004/0204944 | A1* | 10/2004 | Castillo | 704/500 |
| 2006/0132596 | A1* | 6/2006 | Ahonen | 348/14.09 |
| 2007/0055997 | A1* | 3/2007 | Witwer | 725/81 |
| 2008/0278567 | A1* | 11/2008 | Nakajima | 348/14.02 |
| 2010/0100643 | A1* | 4/2010 | Shim et al. | 710/1 |
| 2010/0251319 | A1* | 9/2010 | Sawada | 725/119 |
| 2010/0302346 | A1* | 12/2010 | Huang et al. | 348/14.09 |
| 2011/0246908 | A1* | 10/2011 | Akram et al. | 715/752 |
| 2011/0251987 | A1* | 10/2011 | Buchheit | 706/46 |

\* cited by examiner

*Primary Examiner* — Duc Nguyen
*Assistant Examiner* — Theodore Ndje

(57) ABSTRACT

A device may detect an event, determine a display layout in accordance with the event, receive input video streams, merge two or more of the input video streams into a high definition output stream in accordance with the display layout, and send the high definition output stream to a content presentation device.

21 Claims, 10 Drawing Sheets

MERGING CONTENT

BACKGROUND

Many of today's entertainment or communication-related electronic devices rely on receiving, transmitting, and/or using streaming digital data or content. For example, a set-top box may receive broadcast television programs and/or video-on-demand (VOD) that is streamed from a content provider. A personal computer may receive a stream of a video clip over the Internet. A soft phone may receive streaming audio data over a real-time transport protocol (RTP) link/channel that is established over an Internet Protocol (IP) network.

DETAILED DESCRIPTION

The following detailed description refers to the accompanying drawings. The same reference numbers in different drawings may identify the same or similar elements. As used herein, the terms "playing content" may refer to decoding encoded content, and outputting the decoded content to a presentation device (e.g., television). The encoded content may be obtained from a local media (e.g., hard disk drive) or received from a remote device over a network.

Figure 1:
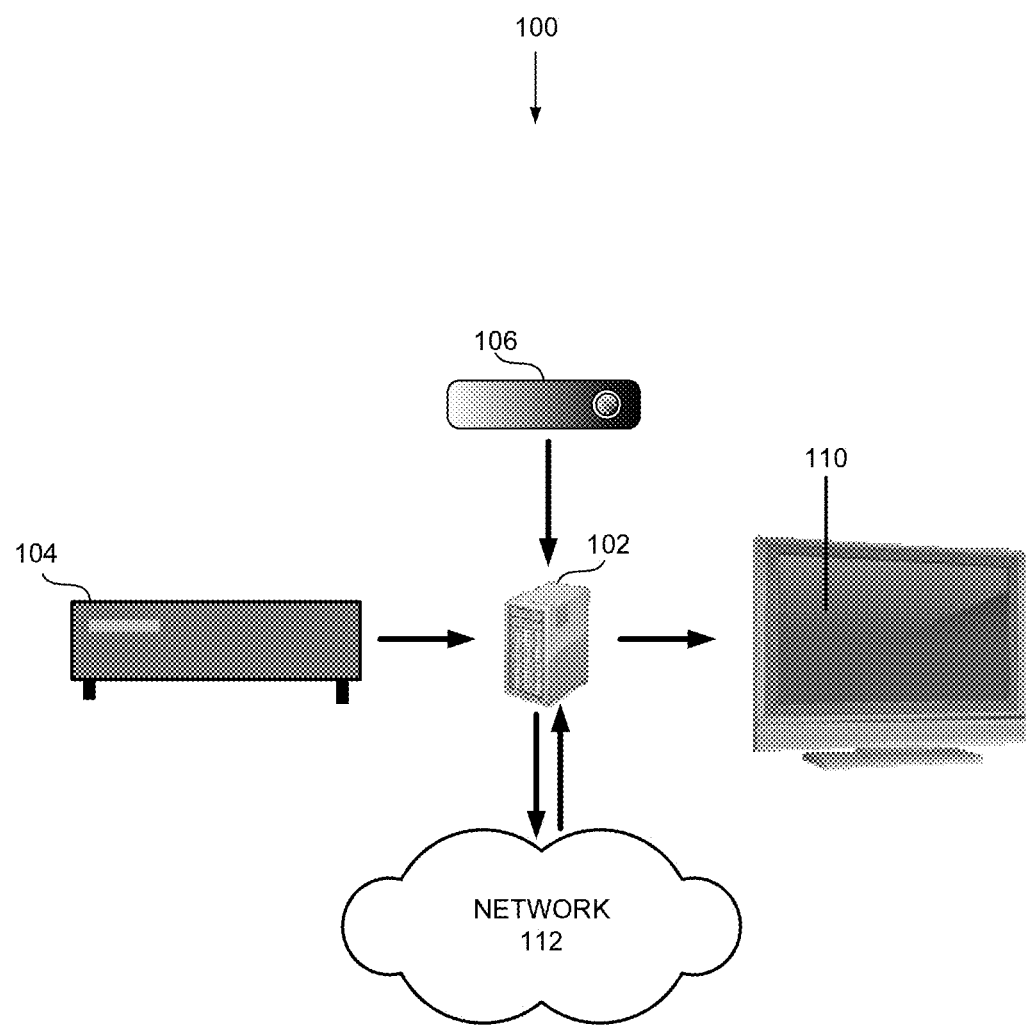
FIG. 1 illustrates an exemplary system in which an exemplary content merging device may be implemented.

As described herein, a device may receive streams of content (e.g., video streams, audio streams, etc.) and merge the streams to be output on one or more devices (e.g., display screens, televisions, speakers, etc.). FIG. 1 illustrates an exemplary system in which a content merging device 102 may be implemented. As shown, system 100 may include content merging device 102, a set-top box 104, a digital video recorder (DVR) 106, a digital television 110, and network 112 (e.g., an Internet Protocol (IP network)).

In FIG. 1, content merging device 102 may receive different video inputs from one or more of set-top box 104, DVR 106, and/or network 112. Furthermore, content merging device 102 may combine/merge the received video streams into a single stream, and send the combined stream to digital television 110. Content merging device 102 may combine the received video streams such that when the combined stream is displayed at digital television 110, each of the received videos is displayed in an area that is set in accordance with a default or user-specified configuration of content merging device 102.

Figure 2A:
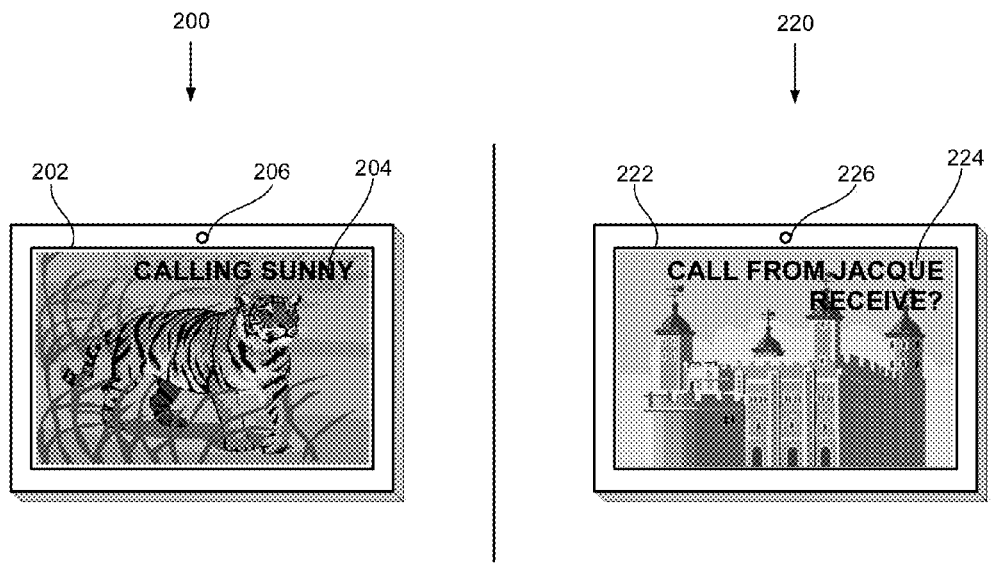
FIGS. 2A and 2B illustrate exemplary operation of the content merging device of FIG. 1.
Figure 2B:
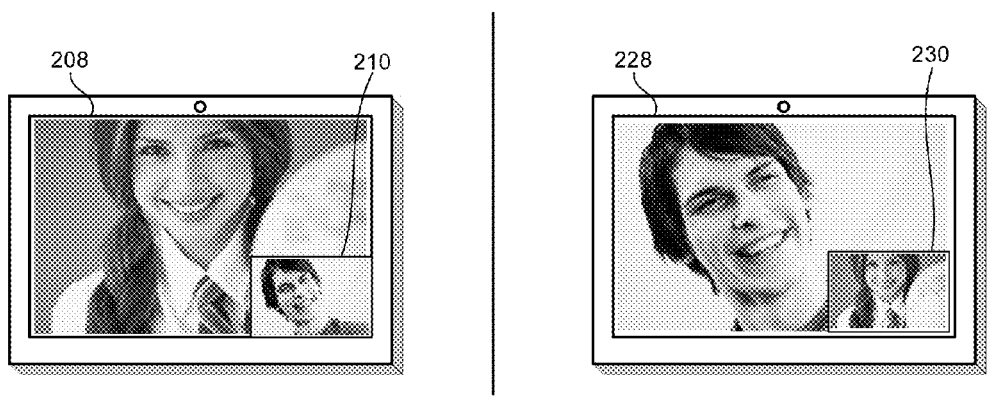

FIGS. 2A and 2B illustrate exemplary operation of content merging device 102. Assume that Jacque and Sunny have installed, in their respective homes 200 and 220, a content merging system 100. Jacque is watching a documentary film Tigers 202 that is playing on his DVR 106 and being output to his digital television 110. Sunny is watching a cable television movie The Three Musketeers 222 that is playing at her set-top box 104 and being output to her digital television 110.

While watching the film Tigers 202, Jacque decides to place a videophone call to Sunny via a soft videophone installed on content merging device 102. Using a remote control, Jacque dials Sunny's videophone number. The soft videophone shows a status message 204 of the call on Jacque's television 110. When Jacque places the call, a soft videophone on content merging device 102 at Sunny's home 220 displays a text message 224 on Sunny's digital television 110, indicating an incoming call.

When Sunny receives Jacque's call, the soft videophones at Sunny and Jacque's content merging devices 102 establish communication sessions over network 112. The soft videophone at Jacque's content merging device 102 receives a video of Jacque via a camera 206 included in Jacque's digital television 110 and streams the video to Sunny's content merging device 102.

In response, Sunny's content merging device 102 merges the received video of Jacque 228 and the video of Sunny 230 from camera 226 into a single video stream. The right side of FIG. 2B shows Sunny's digital television 110 displaying the combined video stream, with Sunny's video 230 merged within Jacque's video 228. Similarly, Jacque's content merging device 102 merges the received video of Sunny 208 and the video of Jacque 210 from camera 206 into a single video stream. The left side of FIG. 2B shows Jacque's digital television displaying the combined video stream, with Jacque's video 210 merged within Sunny's video 208.

Figure 2C:
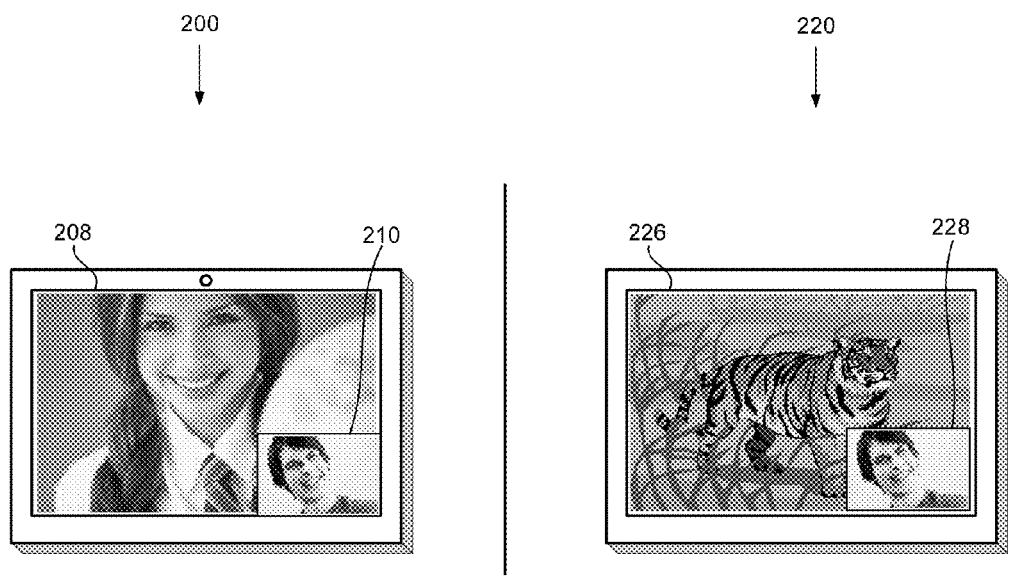
FIG. 2C illustrates another exemplary operation of the content merging device of FIG. 1.

FIG. 2C illustrates another exemplary operation of content merging device 102. In this example, assume that Jacque wants to send the video stream of Tigers 202 to Sunny. Jacque may activate a menu and select, for example, via a remote control, to send a combined video stream of Tigers 202 and video 228 to Sunny. The right side of FIG. 2C depicts Sunny's digital television 110 showing the combined video stream (from Jacque's content merging device 102) that includes the video stream 228 for Tigers and the video stream 228 of Jacque.

In the above illustrations associated with FIGS. 2A through 2C, content merging device 102 merges video streams in the context of video telephony, videoconferencing, and/or video telepresence. In some implementations, content merging device 102 may include a user interface (e.g., a graphical user interface (GUI) that allows a user to select a number of streams to be combined (e.g., streams from set-top box 104, DVR 106, a multitude of video phone callers in network 112, an audio device, a computer, etc.). The merged or combined streams may be output to different output devices or components (e.g., a hard disk drive (e.g., to store the combined stream), a network interface (to send the combined stream over a network), etc.).

In the above, content merging device 102 may be interconnected to different media devices that would otherwise be connected to television 110. Thus, using content merging device 102 in system 100 may reduce the number of cables that are connected to digital television 110. In addition, because content merging device 102 may be a separate device from set-top box 104, content merging device 102 may be manufactured and sold independently from set-top box 104 vendors. Further, content merging device 102 may allow video telepresence, video teleconference, and/or videophone services to be provided independently from content providers. For example, a videophone service may be provided by a vendor independently from a service provider for a cable network.

Figure 3:
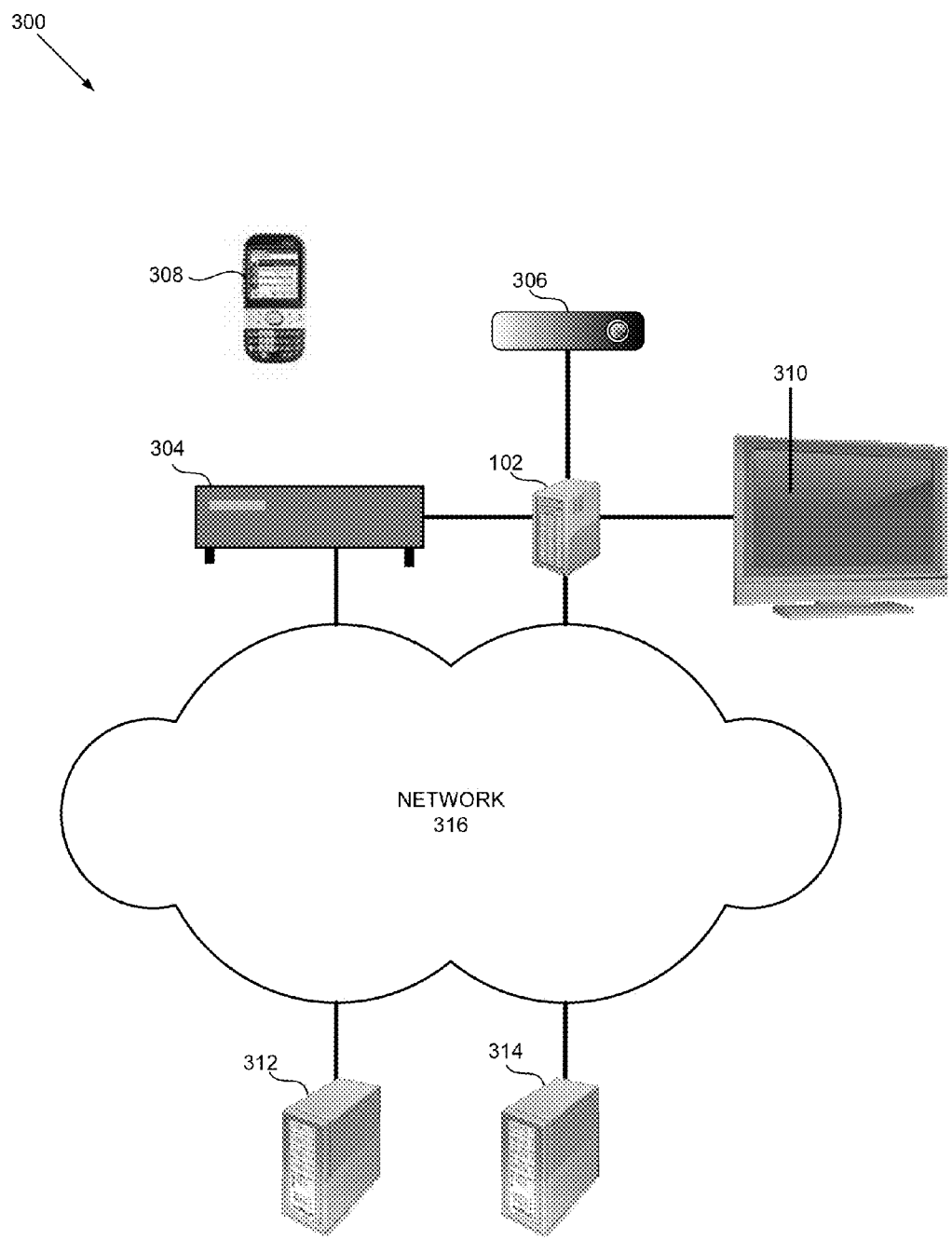
FIG. 3 shows an exemplary network in which concepts described herein may be implemented.

FIG. 3 shows an exemplary network 300 in which concepts described herein may be implemented. As shown, network 300 may include a content merging device 102, content delivery device 304, content player device 306, mobile device 308, content presentation device 310, content provider device 312, content storage device 314, and network 316.

Content merging device 102 may execute one or more applications that receive content streams from devices over network 316, content delivery device 304, content player device 306, mobile device 308 (e.g., a handset), and/or another device. In addition, content merging device 102 may merge or combine the received streams into one or more output streams and send the output streams to mobile device 308, devices in network 316, and/or content presentation device 310.

Content delivery device 304 may receive encoded content over network 316, decode the content, and/or output the decoded content to content merging device 302 and/or content presentation device 310. In some implementations, content delivery device 304 may obtain the content from a content provider device 312, which may be part of a content distribution system (e.g., a video/audio broadcast system, content-on-demand distribution system, and/or local storage component (e.g., a hard disk drive)).

In addition to outputting decoded content to content merging device 102 and/or content presentation device 310, content delivery device 304 may perform actions in response to commands (e.g., fast forward, pause, select a program/content, etc.) that are issued from a remote control or from content merging device 102.

Examples of content delivery device 304 may include a set-top box or a component (e.g., a cable card) that plugs-into a host device (e.g., a digital video recorder, a personal computer, a television, a stereo system, etc.) and allows the host device to display multimedia content (e.g., contents on digital cable television channels). Although content delivery device 304 can be implemented as different types of devices (e.g., a set-top-box, computer, cable card, etc.), in the following, content delivery device 304 is described in terms of a set-top box.

Content player device 306 may receive encoded or decoded content from a local, external storage (e.g., a digital video disc (DVD)), decode the received content if the content is encoded, and/or output the decoded content to content merging device 306 and/or content presentation device 310. In one implementation, content player device 306 may output the stream, via a high definition multimedia interface (HDMI) cable, to content merging device 102.

Mobile device 308 may include a handset, cellular phone, and/or another type of communication device. In one implementation, mobile device 308 may function as a cellular telephone. In some instances, mobile device 308 may place an outgoing call on behalf of a user over a wireless link (e.g., Bluetooth) via content merging device 102. In another implementation, mobile device 308 may operate as a wireless/cordless handset for content merging device 102. In such an implementation, content merging device 102 may operate as a base station for mobile device 308.

Content presentation device 310 may include, for example, a television, display, speakers, etc. Content presentation device 310 may receive digital and/or analog content from content merging device 102 and present the content via its display screen and/or its speakers.

Content provider device 312 may obtain content (e.g., a video program, audio program, advertisement, web page, etc.) from content storage device 314 and/or send the content to content delivery device 304, content merging device 102, and/or content presentation device 310 over network 316. Content storage device 314 may retrieve content (e.g., a movie, a music file, an advertisement, text, web page, etc.) and send the content to content provider device 312 when content storage device 314 receives a request for content from content provider device 312.

Network 316 may include one or more wired and/or wireless networks that are capable of exchanging information, such as voice, video, documents, multimedia, text, etc. For example, network 316 may include one or more public switched telephone networks (PSTNs) or another type of switched network. Network 316 may also include a number of transmission towers for receiving wireless signals and forwarding the signals toward the intended destination. Network 316 may further include one or more packet switched networks, such as an Internet protocol (IP) based network, a local area network (LAN), a wide area network (WAN), a personal area network (PAN), an intranet, the Internet, or another type of network that is capable of exchanging information. In FIG. 3, devices 302 through 314 may communicate directly with one another or communicate with one another via network 316

Depending on the implementation, network 300 may include additional, fewer, different, or different arrangement of devices than those illustrated in FIG. 3. For example, in one implementation, network 300 may include additional content merging devices, content delivery devices, content presentation devices, etc. In another example, network 300 may include a personal computer or a laptop computer that is communicating with content merging device 102 via local network connections. In FIG. 3, network 300 does not show some elements of network, such as routers, bridges, switches, gateways, servers, etc., that route data in network 300.

Figure 4A:
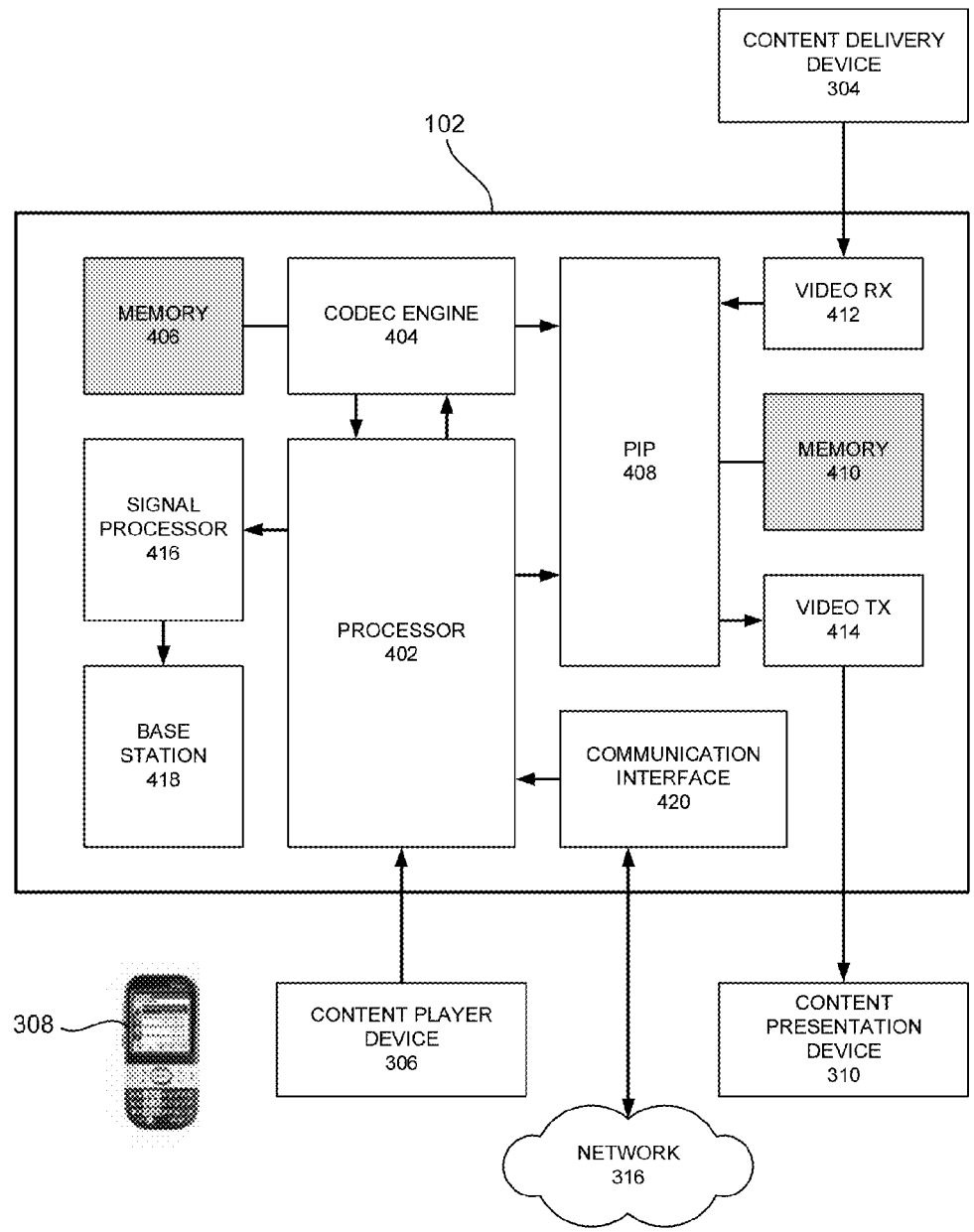
FIG. 4A is a block diagram of exemplary hardware components of the content merging device of FIG. 3.

FIG. 4A is a block diagram of exemplary hardware components 402-420 of content merging device 102. As shown, content merging device 102 may include a processor 402, codec engine 404, memory 406, picture-in-picture (PIP) module 408, memory 410, video receiver 412, video transmitter 414, signal processor 416, base station 418, and communication interface 420.

Processor 402 may include one or more processors, microprocessors, Application Specific Integrated Circuits (ASICs), Field Programmable Gate Array (FPGA) devices, and/or other processing components capable of processing data and/or controlling content merging device 102. In some implementations, processor 402 may include one or more embedded processors for high-speed video processing and/or communication. As shown, processor 402 may coordinate data traffic between communication interface 420, external device (e.g., content player device 306 via Universal Serial Bus (USB)), codec engine 404, PIP module 408, etc. In one implementation, processor 402 may be coupled to a high speed, low power memory, such as a double data rate 2 memory, a synchronous dynamic random access memory (DDR2 SDRAM) or a storage device, such as NAND flash storage.

Codec engine 404 may include one or more codec components (e.g., processors for encoding/decoding data). Each codec component may implement a specific encoding/decoding scheme. In addition, codec engine 404 may manage resources for the codec components (e.g., allocate memory). Memory 406 may provide a dynamic memory pool from which codec engine 404 may allocate memory for a codec component. Memory 406 may include, for example, mobile double data rate (MDDR) synchronous dynamic random access memory (SDRAM) or DDR SDRAM. A MDDR may consume less power than a number of other types of SDRAM, and provide for greater power efficiency.

PIP module 408 may include one or more processors for merging the frames of received content streams (e.g., each of the frames of streams from content delivery device 304, content player device 306, network 316, etc.) into frames of an output stream in accordance with a layout. For example, assume that PIP module 408 receives two content streams (e.g., a content stream from a videophone call and another stream from a camera (not shown)) via processor 402 and codec engine 404, respectively. In response, PIP module 408 may place frames or portions of frames of the received streams within each frame of an output stream. The specific layout (e.g., how the received frames are combined to produce an output frame) may be dependent on a specific application/logic that is running on content merging device 102. PIP module 408 may generate and write each of the frames of the output stream to memory 410.

Memory 410 (e.g., SDRAM) may temporarily store each frame of the output stream until the frame is transmitted via video transmitter 414. Video receiver 412 may receive video and/or audio streams (e.g., HDMI stream) that are output from content delivery device 304, decode the streams (e.g., the stream may be high content digital content protection (HDCP) encoded) and relay the decoded video stream to PIP module 408, where the video stream is merged with other streams. Video transmitter 414 may encode (e.g., HDCP encode) and stream frames that are buffered in memory 410, along with an audio stream, as an output stream (e.g., HDCP encoded HDMI stream) to content presentation device 310.

Signal processor 416 may receive an audio signal from processor 402, process the audio signal (e.g., perform audio echo cancellation (AEC)) and forward the audio signal to base station 418. Base station 418 may relay the audio signal over a wireless communication link to mobile device 308. In this implementation, mobile device 308 may operate as a handset of a home telephone system.

Communication interface 420 may enable content merging device 102 to communicate with other devices and/or systems in network 316 or network 300. For example, network interface 420 may communicate via a network, such as the Internet, a terrestrial wireless network (e.g., a WLAN, WiFi, etc.), a public switched telephone network (PSTN), a satellite-based network, etc. Communication interface 420 may include a modem, an Ethernet interface (e.g., 10/100/1000 Mb) to a LAN, and/or an interface for connecting network device 420 to other devices (e.g., via a Bluetooth interface).

Depending on the implementation, content merging device 102 may include additional, fewer, or different components than the ones illustrated in FIG. 4A (e.g., plug-in cards for additional serial buses, hard disk drives, display screens (e.g., liquid crystal display (LCD), camera, microphone, speakers, infrared signal detector (e.g., for a remote control), microphone, etc.). In addition, for simplicity, FIG. 4A does not show other components of content merging device 102, such as additional memories (e.g., read-only-memory (ROM)), local cache, etc.).

Figure 4B:
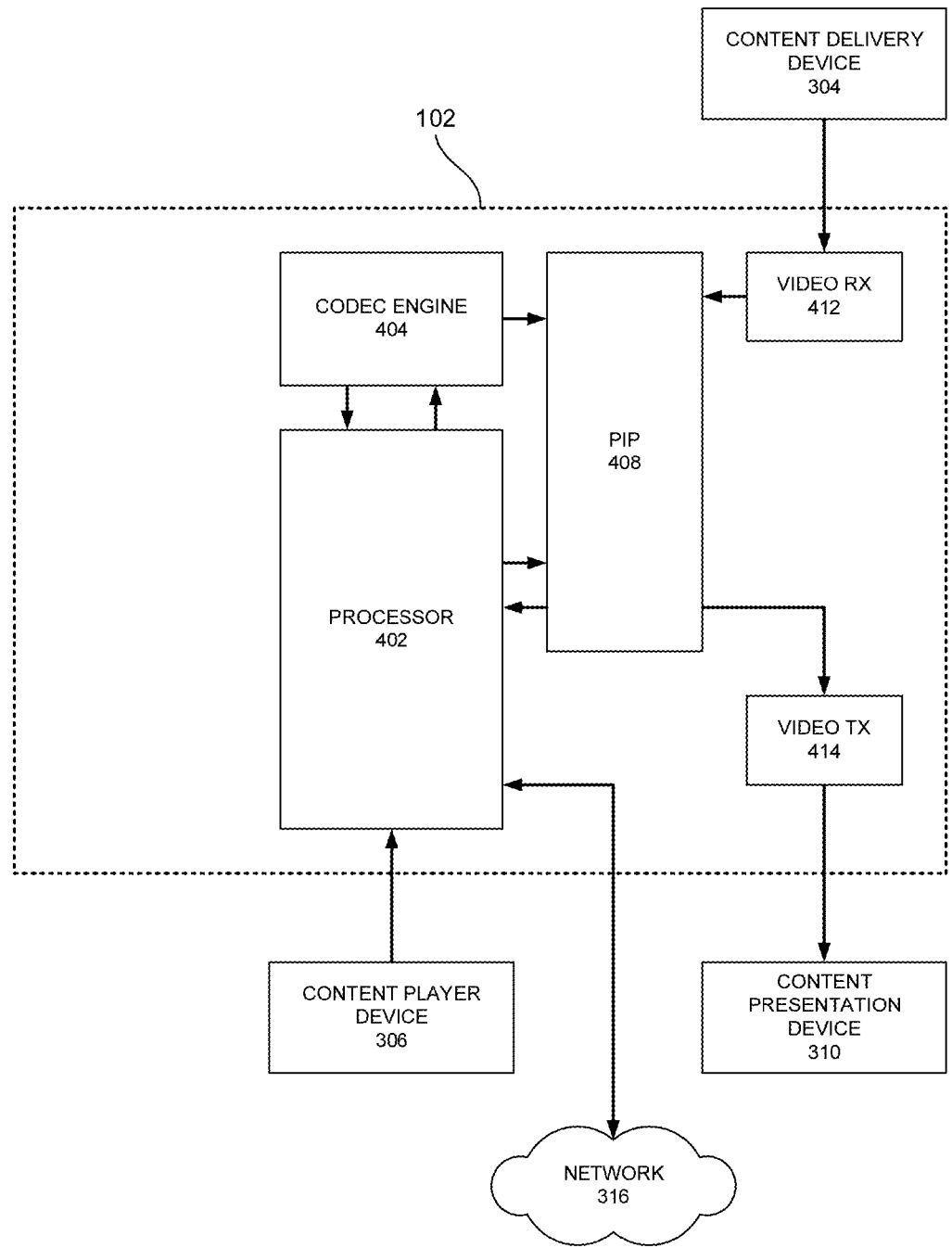
FIG. 4B is a block diagram illustrating flow of content streams through the components of FIG. 4A.

FIG. 4B is a block diagram illustrating flow of content streams through some of the components of content merging device 102. As shown, content streams may arrive from content delivery device 304, network 316, and content player device 306. Although content merging deice 302 may receive other streams (e.g., a stream from a camera installed on content presentation device 310), FIG. 4B does not show them for simplicity.

In FIG. 4B, the content streams from network 316 and content player device 306 are routed by processor 402 to codec engine 404, decoded at codec engine 404, and sent to PIP module 408. PIP module 408 combines the streams from processor 402 and content delivery device 304 (via video receiver 412), and outputs the combined stream to content presentation device 310 (via video transmitter 414).

In FIG. 4B, some data paths are not shown for simplicity. For example, processor 402 may route the output stream from PIP module 408 to codec engine 404, to obtain an encoded stream. Processor 402 may send the encoded stream to network 316 via communication interface 420. In another example, processor 402 may receive audio input via a microphone and route the audio signal to signal processor 416. Each data path may depend on the applications, logic, and/or software components that are installed and/or running on content merging device 102.

Figure 4C:
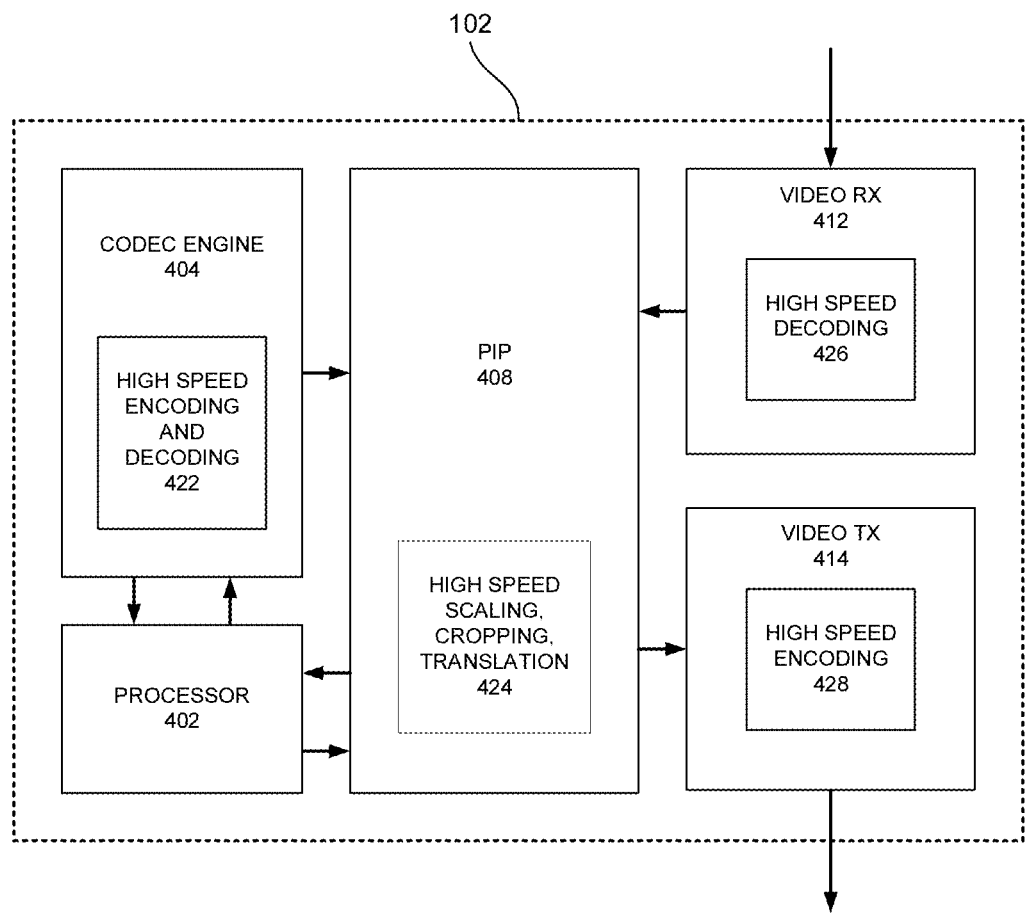
FIG. 4C is a block diagram illustrating some of the exemplary functions of the components of FIG. 4B.

FIG. 4C is a block diagram highlighting some of the exemplary high speed functions of the components of FIG. 4B. As discussed above, video processing functionalities of content merging device 102 may be distributed over hardware components, some of which are shown in FIG. 4C as processor 402, codec engine 404, PIP module 408, video receiver 412, and video transmitter 414. Some of these functions may be performed at high speeds.

For example, processor 402 may direct and/or regulate high speed traffic between network 216, codec engine 404, PIP module 408, and/or external devices. Codec engine 404 may perform high-speed encoding or decoding 422 of data from network and/or other external devices. Codec engine 404 may receive/output the data via processor 402 and/or PIP module 408.

PIP module 408 may perform high speed scaling, cropping, and/or translating 424 of graphical data in accordance with a predetermined layout, for merging and/or combining video data. Video receiver 412 and transmitter 414 may perform high speed decoding 426 and encoding 428 on data received from an external device and PIP module 408 (e.g., HDCP decoding/encoding), respectively.

By performing the encoding/decoding functions via codec engine 404, PIP module 408, video receiver 412, and/or video transmitter 414 as illustrated in FIG. 4C, content merging device 404 may avoid bottlenecks in high definition video processing (e.g., merging HDMI video with other video streams) and combine/manipulate the high definition images at high speeds without suffering from, for example, freezing, stopping, etc. In implementations that include a sufficiently fast high-speed general processor(s) and other components to support such processors (e.g., data bus), some of the components (e.g., codec engine 404, PIP module 408, etc.) in FIG. 4A may be replaced with software modules/components (e.g., a software codec engine).

Figure 5:
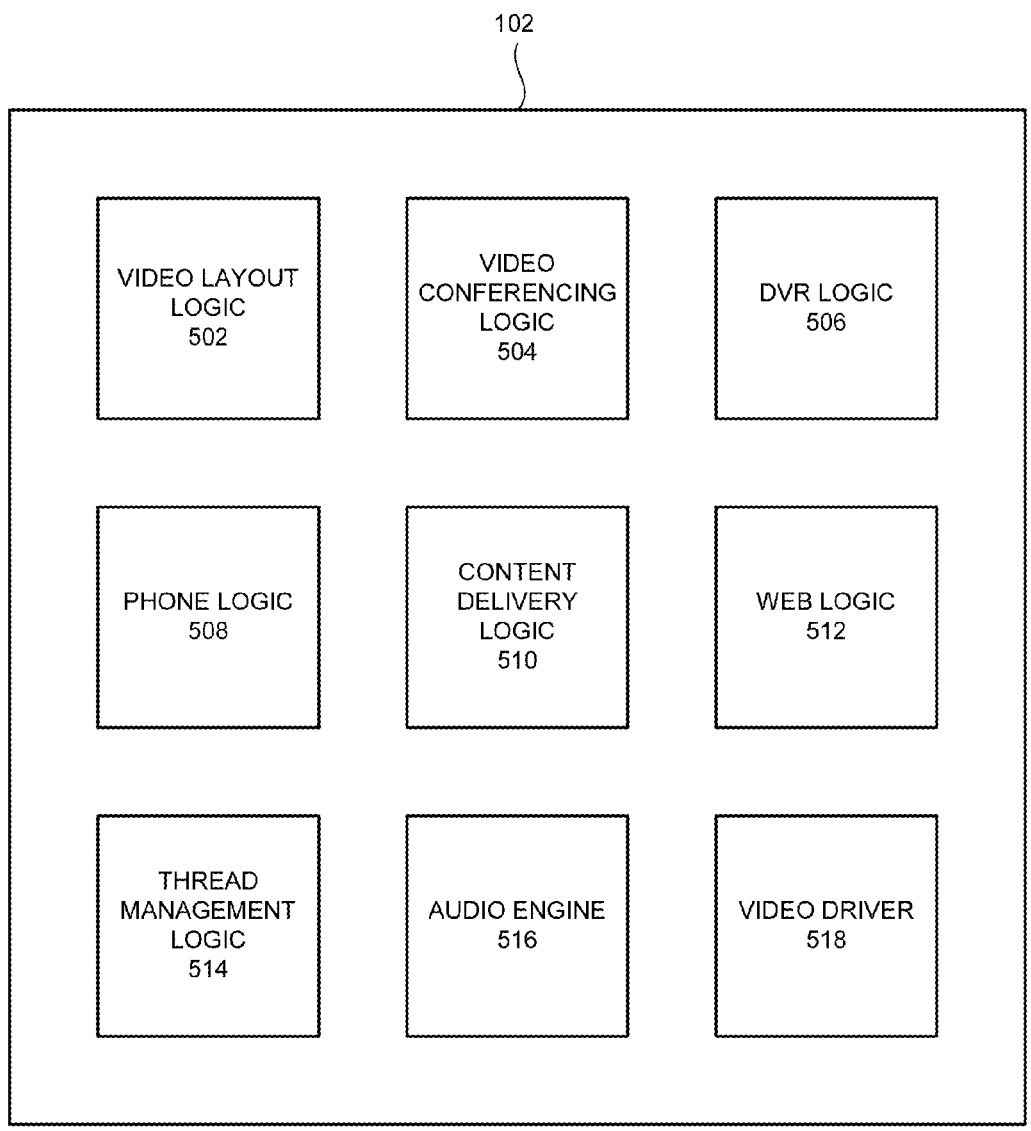
FIG. 5 is a block diagram of exemplary functional components of the content merging device of FIG. 3.

FIG. 5 is a block diagram of exemplary functional components of content merging device 102. As shown, content merging device 102 may include video layout logic 502, video conferencing (or video telepresence) logic 504, DVR logic 506, phone logic 508, content delivery logic 510, web logic 512, thread management logic 514, audio engine 516, and video driver 518. All or some of these logic components may be implemented by processor 402, PIP module 408, and/or codec engine 404 executing software instructions stored in a memory (e.g., a memory coupled to processor 402).

Depending on the implementation, content merging device 102 may include additional, fewer, different, or different arrangement of components than those illustrated in FIG. 5. For example, in one implementation, one component may include functionalities of one or more components (e.g., video layout logic 502 is included in video conferencing logic 504). In addition, for simplicity, FIG. 5 does not show a number of components, such as a graphical user interface (GUI) components, an operating system (e.g., Linux), a hardware abstraction layer, network communication software, applications/scripts (e.g., http server, XML parser, common gateway interface (CGI), dynamic host configuration protocol (DHCP) client, WiFi client, etc.), etc.

Video layout logic 502 may specify a layout of windows or portions of a display for displaying different video streams received at content merging device 102. In one implementation, video layout logic 502 may receive user input, and based on the user input, define the layout. For example, video layout logic 502 may receive user input (via a GUI) which specifies that a video stream from content player device 306 (e.g., DVR 106) is to be shown in a small area within another area that shows a video stream from content delivery device 304.

In addition, based on different content streams that are received and based on different states of logic 504-512, video layout logic 502 may set a current layout for PIP module 408. PIP module 408 may merge different video streams in accordance with the current layout, such that each of the merged streams is displayed in a corresponding area in the current layout.

Video conferencing logic 504, DVR logic 506, phone logic 508, and content delivery logic 510 may handle content streams from/to a soft videophone installed on content merging device 102 (not shown in FIG. 5), DVR 306, mobile device 308, content delivery device 304, and/or network 316. For example, assume that Jacque receives a videophone call from Sunny. Upon receiving the call, video conferencing logic 504 may notify Jacque of the incoming call and display a GUI (e.g. a menu that is overlaid on an output stream). Via the GUI, Jacque may accept the call and notify video layout logic 502 that he is accepting the call. In a different implementation, video layout logic 502 may actively poll video conferencing logic 504 (or any other logic 506-512) to identify new streams or terminations of existing streams. Based on the result of polling, video layout component 502 may identify a current layout for PIP module 408.

In some implementations, each of video conferencing logic 504, DVR logic 506, phone logic 508, content delivery logic 510, and web logic 512 may receive user/viewer input or commands, e.g., via a remote control for controlling a video conferencing device (e.g., a device installed external to content merging device 102), content player device 306, mobile device 308, content delivery device 304, and/or a browsing device (not shown) and relay the input or commands to the video conferencing device, DVR 306, mobile device 308, content delivery device 304, and the browsing device via wired/wireless communication links. In these implementations, logic 504-512 may indicate any new streams or terminations of content streams to video layout component 502 when a particular input/command is transmitted to the controlled device.

Thread management logic 514 may allocate processing cycles to threads for handling different processes. For example, in one implementation, thread management logic 514 may allocate processing time to threads for receiving user input to change a layout, to threads for encoding or decoding video streams from different devices, to threads for handling incoming videophone calls, etc.

Audio engine 516 may process audio signals. The audio signals may be received via a microphone that is connected to content merging device 102, mobile device 308, video receiver 412, content player device 306 (e.g., DVD player or compact disc player), content delivery device 304, etc. For example, in one implementation, audio engine 516 may include a band pass digital filter. Video driver 518 may include logic for controlling video components, such as video receiver 412, video transmitter 414, etc.

Figure 6:
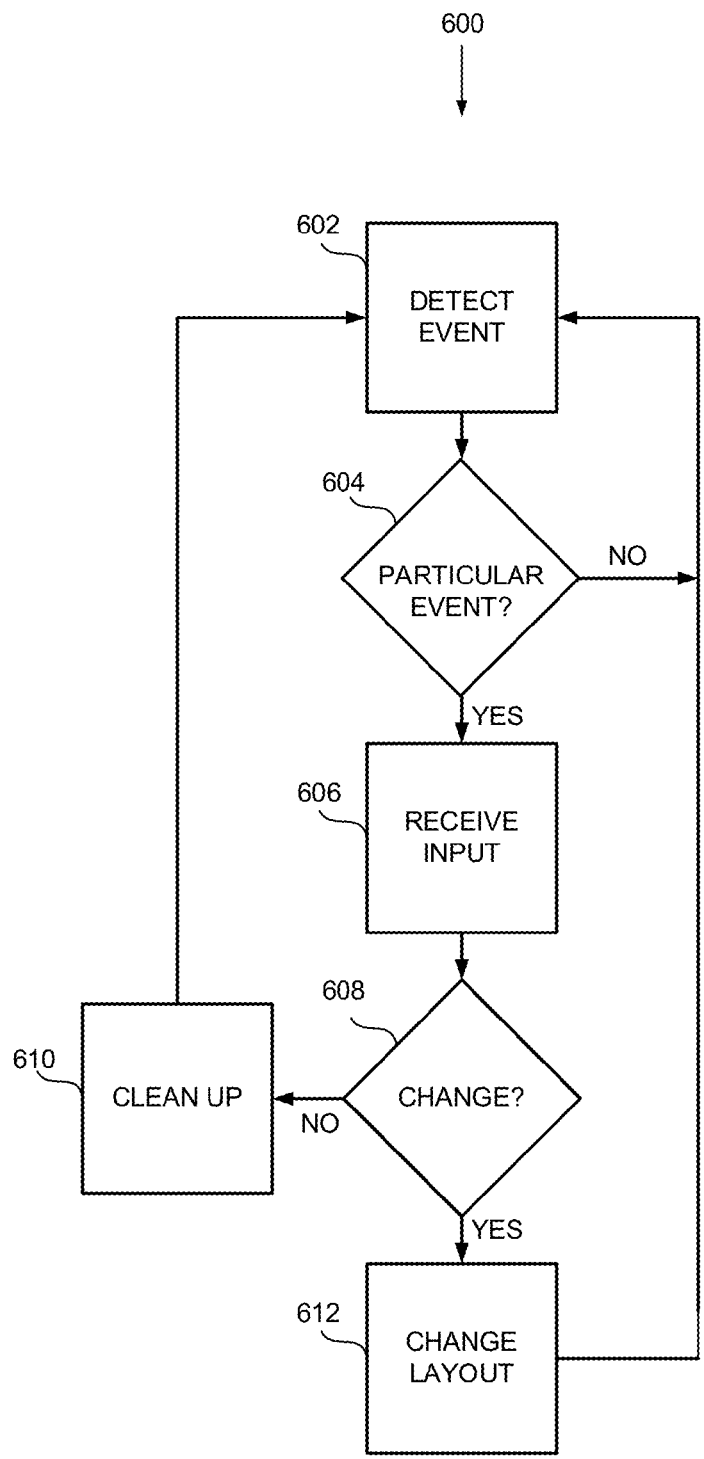
FIG. 6 is a flow diagram of an exemplary process associated with changing a layout for displaying content streams.

FIG. 6 is a flow diagram of an exemplary process 600 associated with changing a layout for displaying content streams. As indicated above, PIP module 408 may combine or merge received streams in accordance with a layout. The layout may change, depending on the state of content merging device 102. In an exemplary implementation, the state may change due to different factors, such as viewer/user input, occurrence of an event (e.g., arrival of a videophone call, termination of an ongoing call, starting a new application that outputs different streams to different areas of the display screen of content presentation device 310, etc.).

Process 600 that is associated with changing a layout may start with a detection of an event (block 602). The event may be driven, for example, by an application, by an external device (e.g., content delivery device 304, by a user who modifies the layout via a GUI, etc. Assume, for example, that the event is an incoming videophone call.

Content merging device 102 may determine, upon detection of an event, whether an event of a particular type has occurred (block 604). For example, content merging device 102 may determine whether a user-initiated event that changes a layout has occurred, a soft videophone has received an invite message to establish a communication session, a new video stream has been created, an ongoing videophone call terminated, etc. If the event of the particular type has not occurred (block 604—NO), process 600 may return to block 602.

If the event has occurred (block 604—YES), content merging device 102 may receive input from a user (block 606). Upon the occurrence of the event, content merging device 102 may alert or prompt the viewer for additional input. For example, after receiving an invite message from a remote videophone caller, content merging device 102 may display, at content presentation device 310, a text message. The text message may show a caller ID and may request the user to indicate whether the user will accept the call. In another example, content delivery device 304 may begin to stream a particular television program. Upon detecting the start of the transmission, content delivery device 304 may request that the user confirm whether the user will view the content.

In some implementations, performing block 606 may entail several iterations of receiving user input and providing the user with different options. For example, assume that the user has entered a menu. Via a GUI interface, the user may select different layout options (e.g., a location or size of a viewing window for one type of content stream, etc.). This may require the user to provide several inputs in the hierarchy of menus.

Content merging device 102 may determine whether the input indicates an immediate change in the viewing layout (block 608). For example, assume that at block 606, the user has indicated that the user will accept an incoming videophone call. In such a case, content merging device 102 may determine that the viewing layout is to be changed (e.g., display the video stream from a remote caller and a video stream from a camera that is connected to content merging device 102).

In another example, assume that at block 606, during the videophone call, the user has activated a menu screen (e.g., via a remote control) and selects a streaming video from content delivery device 304 to be sent to the caller. The selection may indicate to content merging device 102 to modify the current viewing layout.

In yet another example, assume that the user has received, during the videophone call, another videophone call and the user has indicated that the user will accept the second call. The input may indicate to content merging device 102 that the video stream from the second caller is to be displayed, along with other streams, at content presentation device 310.

If the input indicates that the current layout is to be changed (block 608—YES), content merging device 102 may change the current layout (block 612). As indicated above, depending on the state of content merging device 102, video layout logic 502 in content merging device 102 may select a particular layout. For example, when the second videophone call is accepted, video layout logic 502 may select a layout in which two windows display video streams from the callers side-by-side. Furthermore, video layout logic 502 may set the selected layout as the current layout. In response, PIP module 408 may merge the received streams in accordance with the current layout.

If the input indicates that the current layout is not to be changed (block 608—NO), content merging device 102 may perform a "cleanup" (block 610). In some instances, the cleanup may include erasing or removing a text message that is displayed via content presentation device 310. The clean up may return content merging device 102 to a state prior to block 604.

Figure 7A:
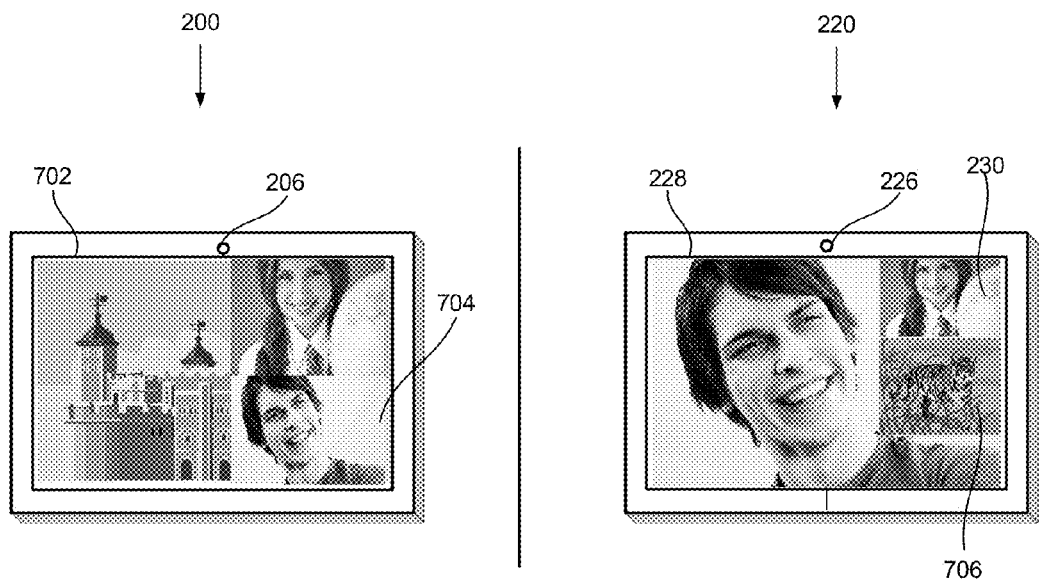
FIGS. 7A and 7B illustrate an example associated with merging content.
Figure 7B:
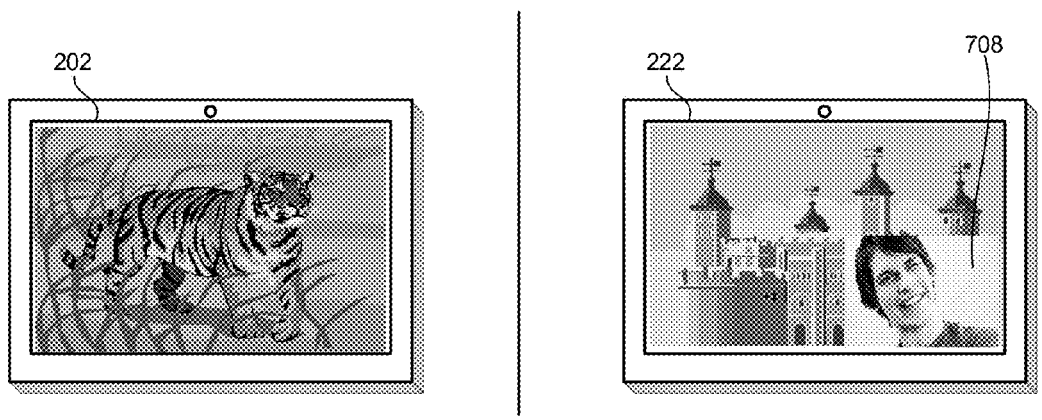

In the above, process 600 illustrates changing a layout that is associated with merging and displaying received video streams. As described, content merging device 102 may merge or combine the video streams in accordance with a selected layout. FIGS. 7A and 7B illustrate different exemplary layouts for merging received video streams. In particular, FIGS. 7A and 7B illustrate exemplary layouts for video streams during the video telepresence session described above with reference to FIGS. 2A through 2C.

FIG. 7A shows layouts of the output streams at digital televisions 110 at Jacque and Sunny's homes 200 and 220 in accordance with processing described with respect to FIG. 6. In Jacque's home 200, content merging device 102 may select a layout that shows, in display area 702, The Three Musketeers 222 and the video of Sunny. Sunny's content merging device 102 may have merged The Three Musketeers 222 and the video of Sunny into a single stream and forward the merged stream to Jacque's content merging device 102 over network 112.

The layout may also include an area 704, which shows a video stream of Jacque from video camera 206. The streams from Sunny's content merging device 102 and the camera are merged at Jacque's content merging device 102, as shown in the left side of FIG. 7A.

In Sunny's home 220, content merging device 102 may select a layout that shows the video stream of Jacque in area 228, Tigers in area 706, and a video stream of Sunny from camera 226 in area 230. In this example, the video streams of Tigers 202 (which Jacque may or may not be watching at that instant) and Jacque are sent as separate video streams from content merging device 102 at Jacque's home 200. The video streams of Tigers 202, Sunny, and Jacque are merged at Sunny's content merging device 102, as shown on the right side of FIG. 7A.

FIG. 7B shows other layouts for output streams content merging devices at Jacque and Sunny's homes 200 and 220. In Jacque's home 200, content merging device 102 may select a layout that shows only Tigers 202 from set-top box 106. In Sunny's home 220, content merging device 102 may merge the video stream of The Three Musketeers 222 from the DVR in Sunny's home and the video stream from content merging device 102 associated with Jacque's camera 206 at Jacque's home 200, as shown in area 708.

In the above, content merging device 102 may merge one or more input content streams into one or more output streams. Because of content merging device 102's interconnectivity to different media devices, using content merging device 102 in network 300 may reduce the number of cables that are connected to content presentation device 310. In addition, because content merging device 102 is separate from content delivery device 304, content merging device 102 may be manufactured and sold independently from the vendors of content delivery devices 304. Further, content merging device 102 may allow video telepresence, video teleconference, and/or videophone service to be provided independently from content providers.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIG. 6, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   input components to receive multiple input video streams, from different first external devices, the input video streams including:
      video content of a user captured at a first communication device for a multi-party video telecommunication session, established by a service provider, with a second communication device, and multimedia content received from a content provider independently of the video telecommunication session established by the service provider;
a first processor to:
  detect an event at the second communication device during the video telecommunication session, independently of receiving the multimedia content front the content provider,
  determine a display layout in accordance with the event, and
  set the display layout as a current layout during the video telecommunication session;
a second processor to:
  combine, during the video telecommunication session, the video content and at least one other of the multiple input video streams into a first output stream in accordance with the current layout; and
  combine during the video telecommunication session, the multimedia content and at least one other of the multiple input video streams into a first output stream, wherein the first output stream and the second output stream differ;
output components to transmit the first output stream to second external devices associated with the second communication device for display in the current layout during the video telecommunication session; and
a network interface to transmit the second output stream, via a network, to the first communication device during the video telecommunication session.

2. The device of claim 1, wherein the device comprises a video conferencing device, a video telephone, or a video telecommunication device.

3. The device of claim 1, wherein the input components include:
  a video receiver for decoding high bandwidth digital content protection (HDCP) encoded stream.

4. The device of claim 1, wherein the network interface includes at least one of:
  a WiFi interface or an Ethernet interface.

5. The device of claim 1, wherein the second processor is further configured to:
  generate a picture-in-picture video of combined multiple high definition video streams corresponding to the second output stream.

6. The device of claim 1, wherein the first output stream includes a high definition multimedia interface (HDMI) stream.

7. The device of claim 1, further comprising a codec engine, wherein the first processor is further configured to decode at least one of the. input video streams via the codec engine and provide the decoded at least one of the input video streams to the second processor to be merged with other input streams.

8. The device of claim 7, wherein the first processor is further configured to:
  send one or more of the input video streams to the codec engine for encoding, and
  send the encoded one or more of the input video streams to the output components.

9. The device of claim 8, wherein the output components include a high speed communication interface via which the encoded one or more of the input video streams are sent to one of the second communication device over a network.

10. The device of claim 1, wherein the first processor is further configured to provide a graphical user interface (GUI) to receive user input that selects the display layout.

11. The device of claim 1, wherein the first external devices include at least one of:
  a set-top box, a computer, a digital video recorder (DVR) device, a handset, or a cellular phone.

12. The device of claim 1, wherein the second external devices include at least one of:
  a digital television or a computer.

13. The device of claim 1, further comprising a double rate synchronous dynamic random access memory coupled to the first processor.

14. The device of claim 1, wherein the event includes at least one of:
  a termination of a videophone call or an incoming videophone call.

15. The device of claim 1, wherein the input video stream including the multimedia content includes a video stream received from a set-top box.

16. A method comprising:
  detecting, by a first content merging device, an event at a first communication device via a multi-party video telecommunication session, established by a service provider, with a second communication device;
  determining, in response to the detecting, whether the event corresponds to a particular type of event;
  prompting, when the event corresponds to the particular type of event and during the video telecommunication session, a user of the first communication device for user input;
  determining, by the first content merging device and during the video telecommunication session, a display layout in accordance with user input received in response to the prompting;
  receiving multiple input video streams, by the first content merging device and during the video telecommunication session, the input video streams including:
    multimedia content provided by a content provider independently of the video telecommunication session established by the service provider, and
    video content of a user captured at the second communication device for the video telecommunication session with the first communication device;
  merging, during the video telecommunication session, the video content and one or more other of the multiple input video streams into a high definition output stream in accordance with the display layout;
  merging, during the video telecommunication session, the multimedia content and one or more other of the multiple input video streams into a second output stream, wherein the high definition output stream and the second output stream differ;
  sending, during the video telecommunication session, the high definition output stream to a content presentation device associated with the first communication device; and
  transmitting, via a network interface of the first content merging device and during the video telecommunication session, the second output stream to a second content merging device associated with the second communication device.

17. The method of claim 16, wherein detecting includes detecting an incoming videophone call and the method further comprises:
  sending one of the input video streams to a caller of the videophone call.

18. The method of claim 17, wherein sending the one of the input video streams to the caller includes encoding the one of the input video streams.

19. The method of claim 16, wherein the user input includes:
   detecting a selection, by the user, that identifies the display layout.

20. A system comprising:
   media devices to send video streams that include a high bandwidth digital content protection (HDCP) encoded stream, wherein at least one of the video streams includes multimedia content from a content provider;
   a first content merging device to:
      receive the video streams from the media devices, wherein at least two of the media devices comprise communication devices that capture video of users via a video telecommunication session, established by a service provider, independently of the multimedia content from the content provider;
      detect an event related to video content received from at least one of the communication devices during the video telecommunication session,
      determine, during the video telecommunication session, a different display layout, corresponding to different ones of the communication devices, in accordance with the event,
      combine, during the video telecommunication session, the video content and one or more of the received video streams into a high definition media interface (HDMI) output stream corresponding to the different ones of the communication devices, in accordance with the different display layouts,
      combine, during the video telecommunication session, the multimedia content and one or more other of the received video streams into a second output stream, wherein the HDMI output stream and the second output stream differ,
      transmit, via a network interface of the first content merging device and during the video telecommunication session, the second output stream to a second content merging device associated with the at least one of the communication devices, and
      transmit, during the video telecommunication session, the corresponding HDMI output stream to a content presentation device associated with the different ones of the communication devices; and
   wherein the content presentation devices display the corresponding HDMI output streams in the different display layouts during the video telecommunication session.

21. The system of claim 20, wherein the content presentation device includes:
   a computer or a digital television.

* * * * *